Sept. 1, 1936.　　O. L. HARBARGER　　2,052,824
BRAKE
Filed June 8, 1935　　2 Sheets-Sheet 1
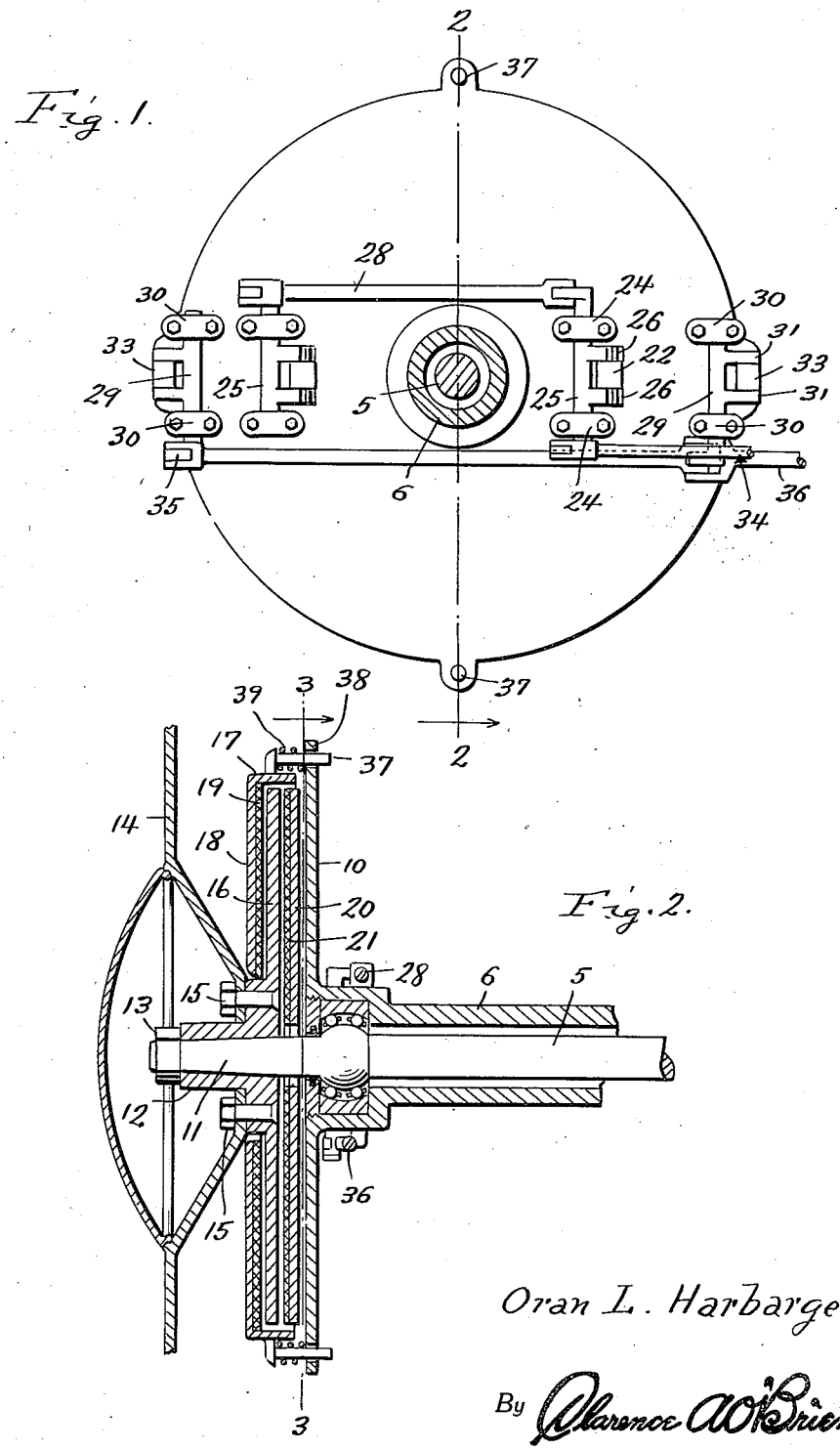
Inventor
Oran L. Harbarger
By Clarence A. O'Brien
Attorney

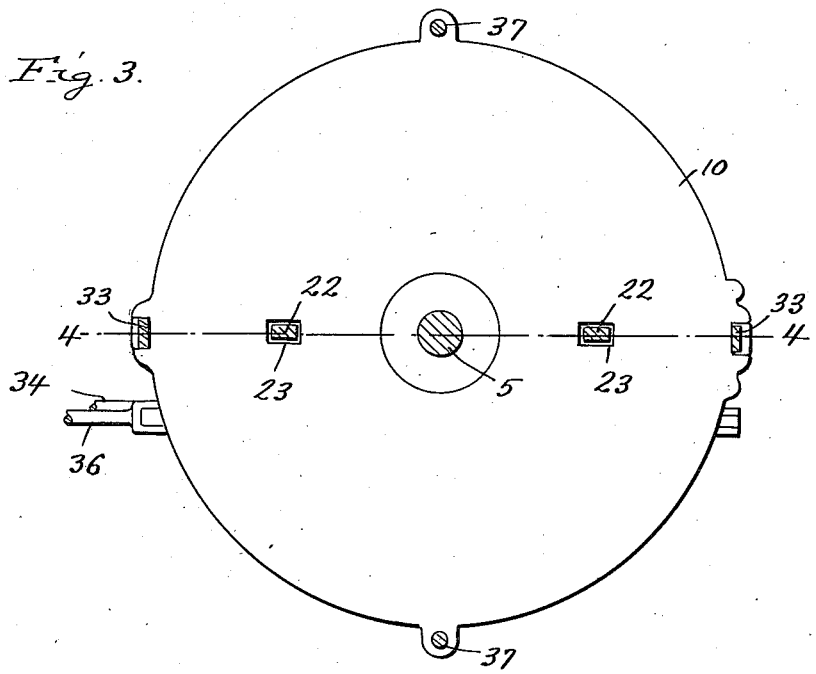
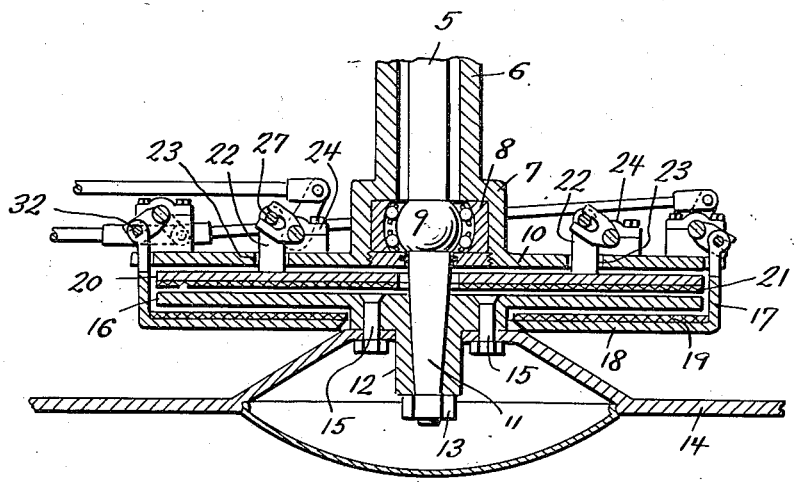

Patented Sept. 1, 1936

2,052,824

UNITED STATES PATENT OFFICE 2,052,824

BRAKE

Oran L. Harbarger, Dawson, Pa., assignor of one-half to Curtis Sechrist, Dawson, Pa.

Application June 8, 1935, Serial No. 25,646

1 Claim. (Cl. 188—71)

This invention appertains to new and useful improvements in brakes and more particularly to brakes of the land vehicle wheeled type.

The principal object of the present invention is to provide a brake for positive operation and most types of brake mechanisms now in general use.

Another important object of the invention is to provide a brake mechanism which in operation is substantially fool-proof.

Another important object of the invention is to provide a brake which is constructed and assembled in such a manner as to permit repair and replacement of parts when needed.

These and various other important objects and advantages of the invention will become apparent to the reader of the following specification.

In the drawings:

Figure 1 represents a sectional view through the axle and its housing looking toward the improved brake mechanism.

Figure 2 represents a sectional view taken substantially on line 2—2 of Figure 1.

Figure 3 represents a sectional view taken substantially on line 3—3 of Figure 2.

Figure 4 represents a transverse sectional view taken substantially on line 4—4 of Figure 3.

Referring to the drawings wherein like numerals designate like parts it can be seen that numeral 5 represents the usual axle which is provided with the tubular housing 6. This housing at the wheel end shown in the drawings has a cup-shaped formation 7 for receiving the ball bearing mount 8 which surrounds the ball-like formation 9 on the axle. This well-like formation 7 is provided with a discular wall structure 10 disposed laterally in the manner substantially shown in Figure 4. Numeral 11 represents a tapering shank at the end of the axle which extends into the tapering bore of the hub structure 12 and therethrough and this shank at its extremity is reduced into a thread to accommodate a nut 13.

The conventional wheel structure 14 is secured to the hub 12 by bolts 15, or in fact any other securing means.

The hub 12 is provided with circumferentially extending disk-like plates 16. Numeral 17 represents a brake drum, the radial wall of which is denoted by numeral 18 and has a brake lining 19, this being opposed to one side of the disk shaped plate 16 on the hub 12. Numeral 20 represents the braking plate which on its side opposed to the disk-shaped plate 16 on the hub 12 is provided with a brake lining 21.

The braking plate 20 is provided with outstanding post members 22—22 which extend through openings 23 in the axle housing plate 10. Adjacent these openings 23 and secured to the outside of the axle housing plate 10 are the bearings 24 through which the stub shafts 25 are journaled. Each of these stub shafts 25 is provided with a pair of bifurcated arms 26—26 which receives the pintle-like extension 27 on the corresponding adjacent post 22. At one end of each of these stub shafts 25 a crank is provided and these cranks are connected pivotally together by the tie rod 28.

At a pair of diametrically opposite points on the plate 10 and adjacent the periphery of the plate are the stub shafts 29—29, journaled in suitable bearing structures 30. Each of these shafts 29 is provided with a pair of spaced bifurcated arms 31—31 for receiving the laterally extending trunnion 32 on the protuberances 33 extending from the peripheral portion 17 of the brake drum.

The remaining end of one of the shafts 25 is provided with a lateral arm to which is pivotally connected the control rod 34 and a similar arm 35 is provided on one end of each of the stub shafts 29—29 and these are connected by the elongated control rods 36 and these rods 34—36 extend to a suitable control point adjacent the driver's seat.

It can be seen, that in operation, actuation of the rods 34—36 will result in the bringing together of the plates 18—20 with their braking surfaces 19—21 respectfully against opposite sides of the hub plate 16 to effect the necessary braking operation.

The peripheral portion of the brake drum 17 is also provided with laterally extending pins 37 which engage through corresponding openings 38 in the disk 10 to serve as guide means, and as shown in Figure 2, coiled compressible springs 39 are placed on these pins 37 and interposed between the brake drum 17 and the said plate 10.

While the foregoing specification sets forth the invention in specific terms it is to be understood that numerous changes in the shape, size and material may be resorted to without departing from the spirit and scope of the invention as claimed hereinafter.

Having thus described the invention, what is claimed as new is:

A wheel brake comprising a hub for supporting a wheel, a circumferentially extending plate on the said hub, a brake drum surrounding the said hub plate and provided with a brake lining opposed to the said hub plate, an axle attached to the said hub, a housing for the axle provided with a circumferentially extending outstanding plate having an opening therein, a braking plate between the housing plate and the hub plate, said braking plate being provided with a brake lining on its side opposed to the hub plate, means for shifting the said braking plate into engagement with one side of the hub plate, said means consisting in providing the housing plate with an opening, a post on the braking plate extending through the said opening in the housing plate, a shaft rotatably mounted on the in-board side of the housing plate and provided with a lateral arm at one end thereof, an elongated actuating member attached at one end to the arm, a second arm on the shaft bifurcated at its free end, and a lateral pintle on the outer end of the post disposed into the bifurcated end of the last mentioned arm.

ORAN L. HARBARGER.